Dec. 21, 1965  H. STRAUB  3,224,540
ELECTROMAGNETICALLY OPERATED MULTIPLE DISC CLUTCH OR BRAKE
Filed Feb. 26, 1962  2 Sheets-Sheet 1

Inventor:
HERMANN STRAUB
by: Albert M Zalkind

Dec. 21, 1965  H. STRAUB  3,224,540
ELECTROMAGNETICALLY OPERATED MULTIPLE DISC CLUTCH OR BRAKE
Filed Feb. 26, 1962  2 Sheets-Sheet 2

United States Patent Office 3,224,540
Patented Dec. 21, 1965

3,224,540
ELECTROMAGNETICALLY OPERATED MULTIPLE DISC CLUTCH OR BRAKE
Hermann Straub, Friedrichshafen, Germany, assignor to Zahnradfabrik Friedrichshafen, Aktiengesellschaft, Friedrichshafen, Germany
Filed Feb. 26, 1962, Ser. No. 175,719
Claims priority, application Germany, Mar. 7, 1961, Z 8,594
6 Claims. (Cl. 192—90)

This invention relates to electromagnetic clutches and more particularly to a clutch of the type disclosed in my previously filed applications, S.N. 167,463, filed January 4, 1962, assigned to the same assignee as the present application.

In the aforementioned previously filed application, there is disclosed a clutch having certain advantages by virtue of the active drive elements being in the form of rollers carried in disc-like rings serving as clutches, the rollers being disposed between friction drive plates. The general arrangement provides for the rollers being at an angle less than 90° to the tangential direction of rotation of the cages and frictional discs whereby a sliding or dragging and rolling action is effected in the course of transmitting torque.

A number of advantages for a clutch of the type described above is the ease of cooling and more particularly the fact that only a very slight axial movement of the clutch sandwich is necessary in order to effect engagement or disengagement. Accordingly, very rapid action is possible for machine control where it is desired either to rotate or stop rotation of a shaft and the structure is inherently useful for either a clutch or a brake.

As in the previously filed application, the present application uses solenoid actuation for clutch control, wherein the arrangement constitutes an improvement over that previously disclosed.

Specifically, it is an object of the present invention to provide a clutch or brake of the kind described wherein control is effected in an extremely simple and economical manner. Other objects and features of the invention will be apparent as the description unfolds.

Briefly, the invention contemplates a construction wherein the clutch sandwich is maintained in engagement by resilient elements, such as coil springs or disc springs. However, the springs are subject to retraction by means of an armature coacting with a solenoid magnet body. The arrangement is such that the residual magnetism of the magnet body is sufficient to retain the armature in spring-compressing condition so that the clutch is actually maintained disengaged by such residual magnetism. In other words, no current is required for holding the armature in spring-retracting condition. When, however, it is desired to engage the clutch, the residual magnetism may be destroyed either by a reverse D.C. current pulse or by application of A.C. current to the solenoid. Upon cessation of the residual magnetism, the springs are permitted to expand, thus exerting a compressing force on the clutch or brake sandwich to carry out the particular purpose of the device.

A detailed description of the invention now follows in conjunction with the appended drawing, in which.

Figure 1:
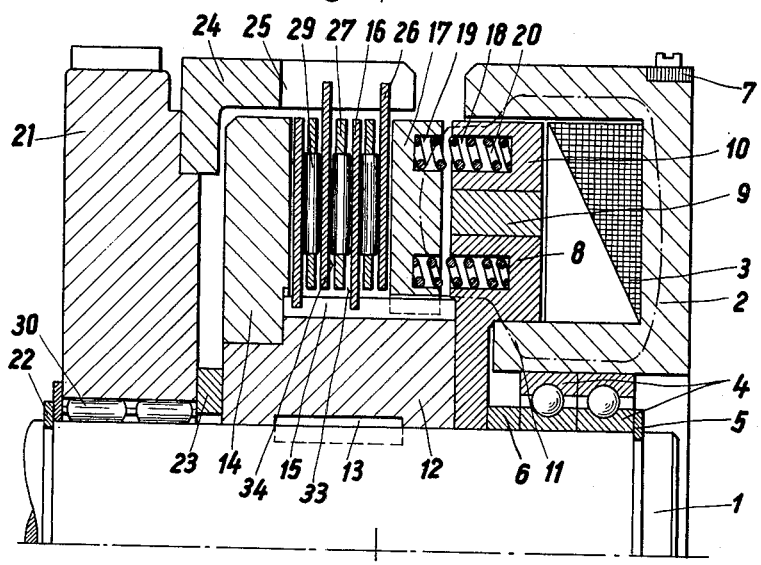
FIG. 1 is an elevational cross section of one form of the invention.
Figure 2:
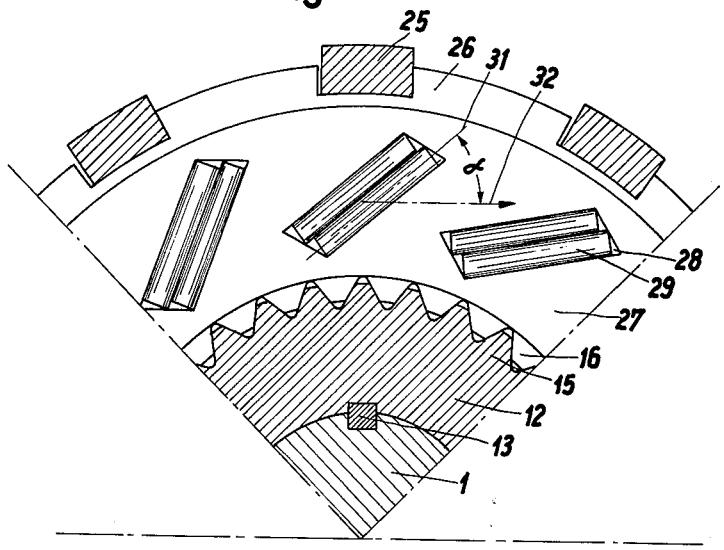
FIG. 2 is a section taken through 1—1 of FIG. 1.

Referring now to FIGS. 1 and 2, a driving shaft 1 is mounted thereon a magnet body 2 which will be understood to be secured to a fixed housing, not shown. The magnet body has therein a solenoid 3, such solenoid being in a toroidal channel, as shown. Bearing races 4 are disposed between the magnet body and the shaft for relative rotative support of the shaft. The bearing constituted by races 4 is retained in position by means of a locking ring 5 and a spacer collar 6, which spacer collar is retained in position by abutment through a series of other components, as will be described in turn.

The usual collector ring 7 is carried on the magnet body in order to bring current to the solenoid in a conventional manner. A disc 8 of magnetizable material is supported within the toroidal channel of the magnet body and has a narrowed flange extending down to the shaft 1, as shown, and abutting spacer ring 6. Circumferentially secured on ring 8 is a non-magnetic ring 9 on which is circumferentially secured a ring 10 of magnetizable material. As will be apparent from the drawing, the composite ring assembly is supported on the hub 11 of the magnet body. The magnetic means or components are of a material capable of permanent magnetization, preferably to saturation. Conceivably, such material may be used just for the magnet body and/or either or both rings, and/or the armature, individually, or in combination.

A collar 12 is keyed at 13 and carried on shaft 1, which collar carries an integrally secured disc or reaction plate 14. Splined at 15 on the outer periphery of collar 12 are a series of frictional plates 16. Frictional plates 26 are slidably splined to fingers 25, extending longitudinally from a ring 24. Drive rollers 29 are carried in slots 28 of rings or cages 27 between pairs of plates 16 and 26. Thus, it will be understood that the sandwich comprising the rollers and the contiguous plates 16 and 26 may be compressed for the purpose of effecting drive or braking between shaft 1 and a gear 21 to which ring 24 is integrally secured. The plates may be of sintered bronze and the rollers of steel.

An additional spacer ring 23 is carried between collar 12 and gear 21, the gear being carried on rollers 30 rotatively on shaft 1 and the entire assembly being maintained locked by means of a locking ring 22 secured to shaft 1. Rollers 29 are set askew, in that their axes (arrow 31) are at the angle alpha with respect to the tangential of arrow 32 of their cages 27.

For the purpose of effecting drive engagement control, armature 17 is slidably splined, as shown, to collar 12 and thus rotates with shaft 1. A plurality of springs 19 are arranged in suitable sockets 18 between armature 17 and rings 8 and 10, as shown. It will be understood that the pair of springs, as shown radially aligned in FIG. 1, is merely exemplary of one possible spring arrangement and said pair of springs may be provided at a plurality of angularly spaced radii around the surface of the armature.

When the solenoid 3 is energized, the flux passes around the magnet body 2 and through the armature via a flux guide member comprising rings 8 and 10 in a well understood manner. Accordingly, armature 17 is attracted toward the magnet body compressing the springs 19, and it will be apparent that no drive or brake effect takes place. It is assumed that D.C. current is used for attraction of the armature at this time. This will leave a certain amount of residual magnetism in the magnetic components to produce a positioning of armature 17, after current cut-off, such that no pressure is effected on the frictional sandwich. In the case of roller and plate elements of this kind, a very slight degree of movement of armature 17, due to the residual magnetism, is sufficient to effect disengagement. Actually, an axial longitudinal movement of the frictional elements of only a few hundredths of an inch is all that is necessary to effect engagement or disengagement, depending on the direction of movement. Therefore, without the use of any expenditure of current in the solenoid other than that initially used for retraction of the armature, the device remains in disengaged condition effected only by residual magnetism, no current being supplied to the solenoid. When it is desired to engage the device, the residual magnetism may be destroyed by a suitable reverse D.C. current of proper amperage and duration. At this time the springs can expand to produce gripping engagement. Likewise, A.C. current can be used to "erase" the residual magnetism.

From the above description, it will be apparent that the particular feature involved in the control of the device is to design the magnetic components so that the residual magnetism, in accordance with convenient current strength, is greater than the strength of the springs 19. It will be appreciated that considerable leeway in design is present; thus the shape, material, solenoid turns and other factors of the magnet and the magnetic rings determine the degree of residual magnetism and, of course, the factor of amount and kind of current supplied is likewise taken into account. Wide variation is possible in the combining of these various factors. For example, the armature might be designed as an element of permanently magnetizable material.

Figure 3:
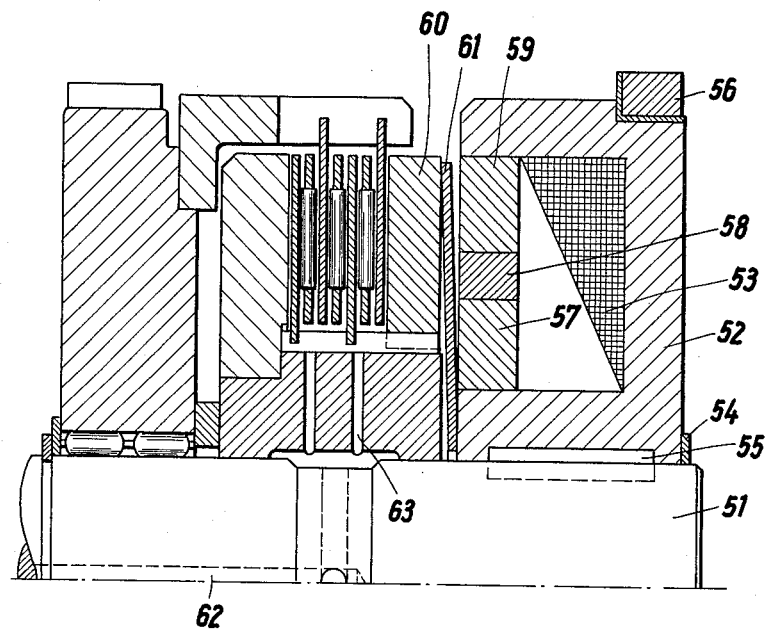
FIG. 3 is a lonigtudinal elevation in cross section of a modified form of the device.

Referring now to FIG. 3, a clutch of the same general description is disclosed having the shaft 51 to which the magnet body 52 is keyed at 55, retained by the locking ring 54 and enclosing the solenoid 53 to which current is supplied by the collector ring 56. In this instance, however, the magnetic flux path is provided by a flux guide member comprising magnetic rings 57 and 59 separated by non-magnetic ring 58 and the composite ring assembly is secured to the magnet body and rotates therewith along with shaft 5. The armature 60 is biased by the disc spring 61 into engaging condition. The action, however, is the same as that described hereinabove, in that the residual magnetism of the magnetic components, after magnetizing current has been cut-off, will maintain a sufficient pull on the armature against the bias force of spring 61 as to maintain the plates disengaged. The destruction of the residual magnetism is accomplished in the manner described hereinabove.

In the form of the invention shown in FIG. 3, a cooling duct is provided through the shaft 51 which communicates by means of suitable channels 63 with the frictional elements so that air or oil may be pumped through the device to effect cooling.

While the control of the device has been described above as being effected only by residual magnetism to maintain a disengaged condition, it has been found usefully expedient for some applications to use a small amount of magnetizing current to act in conjunction with the residual magnetism in order to assure precise control. The use of such partial excitation of the solenoid is particularly desired when an automatically operative switch in the control system is utilized for the purpose of effecting clutch control responsive to armature movement or temperature conditions.

Of particular note is the fact that the arrangement of the armature in both modifications is such as to keep the magnetic field in compact form so that it need not be attenuated by having to pass through the entire frictional disc sandwich. Accordingly, the effect of the residual magnetism produced by saturation of the magnetic components is maintained as strong as possible.

I am aware that various changes may be made from the specific disclosures herein given. For example, various types of magnetic materials can be used or the magnetic components may comprise bodies having particularly strong permanent magnetic field-retention qualities inserted therein in the form of rods, or the like. However, the magnetic components herein disclosed, of conventional permanent magnetic field-retaining characteristics, are of a conventional and readily obtainable nature. In any event, I do not seek to be limited to the precise illustration or description herein given, except as set forth in the appended claims.

I claim:

1. In an electromagnetic clutch, the combination of a plurality of axially movable rotative frictional elements, energizable magnetic means adjacent said frictional elements, resilient bias means disposed to effect engagement of said plurality of frictional elements, said magnetic means comprising a magnetizable body capable of retaining a residual magnetism subsequent to energization by a D.C. source, said residual magnetism being sufficient to overcome said resilient bias to maintain disengagement of said plurality of frictional elements.

2. In an electromagnetic clutch, a magnet body having a solenoid and a flux guide member enclosing said solenoid in said magnet body, a plurality of friction discs and gripping rollers disposed intermediate respective friction discs, armature means, spring means intermediate said flux guide member and said armature means and disposed to bias said armature means against said plurality of friction discs to effect engagement thereof with said rollers, means for connecting certain of said friction discs to a drive shaft and means for connecting other of said friction discs to an element to be driven whereby said engagement effects driving of said element, said armature means being magnetically permeable whereby magnetic flux from said magnet body passes through said guide member to effect a magnetic circuit through said armature and thus bypassing said plurality of discs, said spring means biasing said friction discs for frictional drive engagement in co-action with siad rollers whereby drive engagement is released by energization of said solenoid acting against the bias of said spring means.

3. In an electromagnetic clutch as set forth in claim 2, including means providing coolant passages to said friction discs and said rollers.

4. In an electromagnetic clutch as set forth in claim 3, wherein said spring means comprises a resilient spring disc disposed intermediate said armature means and said flux guide member, said flux guide member comprising a pair of magnetically permeable, concentrically spaced rings, said resilient spring disc extending radially below said rings to engage said magnet body at the inner radial margin of said resilient spring disc, the outer radial margin of said resilient spring disc engaging said armature.

5. In an electromagnetic clutch as set forth in claim 4, said rings and magnet body being of a material capable of retaining magnetism sufficient to overcome bias of said spring means whereby residual magnetism in said rings and magnet body subsequent to energization followed by de-energization of said solenoid maintains a released condition of said friction discs and rollers.

6. In an electromagnetic clutch as set forth in claim 3, said spring means comprising a plurality of compression springs, said armature means and said rings being provided with registering bores, said spring means being disposed in respective pairs of registering bores.

(References on following page)

References Cited by the Examiner

UNITED STATES PATENTS

| | | |
|---|---|---|
| 959,569 | 5/1910 | Martin. |
| 1,265,911 | 5/1918 | Henderson _____ 188—171 |
| 1,928,301 | 9/1933 | Pierson _____ 192—113.2 |
| 2,267,114 | 12/1941 | Lear et al. _____ 192—18.2 X |
| 2,437,871 | 3/1948 | Wood. |
| 2,641,344 | 6/1953 | Banker. |
| 2,695,687 | 11/1954 | Anderson _____ 188—164 |
| 2,956,658 | 10/1960 | Jaeschke. |
| 3,028,737 | 4/1962 | Rudisck _____ 192—90 |
| 3,034,365 | 5/1962 | Stieber _____ 192—30 |
| 3,102,931 | 9/1963 | Simmons et al. ____ 317—165 X |

FOREIGN PATENTS

| | | |
|---|---|---|
| 178,107 | 4/1954 | Austria. |

DON A. WAITE, *Primary Examiner.*

THOMAS J. HICKEY, DAVID J. WILLIAMOWSKY,
*Examiners.*